(12) United States Patent
Darby

(10) Patent No.: X4011
(45) Date of Patent: Jan. 22, 1825

(54) WHEELS, BOXES, CASTING

(76) Inventor: Calvin Darby

Calvin Darby

Letters Patent

The Schedule referred to in these Letters Patent and making part of the same contain-
ing a description in the words of the said Calvin Darby himself of his improve-
ment in the method of constructing the Pattern for casting the small Boxes for
Cart Carriage Waggon and other Wheels.

The improvement consists principally in giving to the box greater strength, grid
or durability and a greater diameter at the end within the wheel so that it may
be fastened almost immoveably in the nave or hub of the wheel. By this last men-
tioned property of the Box an inconvenience which has hitherto been very serious-
ly felt is entirely overcome. The pattern consists of a cylinder having its inner
diameter or calibre tapering or conical of the same dimensions in all respects
as the box to be cast, and its length the same. The outer end or end next to
the linch pin is of the same thickness with the box to be cast. having the
same diameter and is in all respects like it. This thickness however (by what
is meant the depth from the outer to the inner surface of the cylinder) extends no farther
towards the other end than merely to form a convenient and strong rim
or shoulder against which the narrow end of the circular plates hereafter
mentioned shall rest when they are placed upon the cylinder. This cyl-
inder has upon its surface any convenient number of Cams or lugs as they
are sometimes called. being elevated parts like those usually found on wheel
Boxes. and designed to enter grooves to hold the box in its place in the
nave or hub. and keep it from turning ~~with the~~ wheel. The surface
of the cylinder between the Cams (excepting the rim or shoulder afore-
said) is sunk or cut away leaving the whole surface between the cams
(except the rim or shoulders) quite thin so as to make place for the
reception of the circular plates hereafter mentioned. The cams have
grooves in them running from the inner end to the rim or shoulder afore-
said to receive said plates. between the cams is inserted circular plates
having surfaces conformed to the surface of the cylinder, which plates slide
in the grooves aforesaid and fit very exactly to the rim or shoulder afore-
said rising to a level therewith and being sufficiently thick to give to the inner end of the box a greater diameter from outer surface to outer surface than that of the outer end, or end next to the linch pin: when these plates are inserted the pattern has the appearance of a solid box with cams upon the surface, having its inner end of the greatest diameter and thick and strong. The pattern being thus prepared is inserted in sand in the usual ~~[illegible]~~ way with the smallest or linch pin end uppermost, and when drawn, the cylinder comes first out, leaving the plates which have slid out of the grooves to follow it upon strings which connect them therewith or to be removed in any other way convenient to the workman for which there is ample room after taking out the cylinder without disturbing the sand. Thus is a mould formed for casting having all the properties aforesaid, which it imparts to the box, namely a greater diameter to the inner end than at the linch pin end; so that it can easily be fastened firmly into the nave or hub; and greater strength and durability because it has greater thickness. This kind of mould may be usefully employed in all cases where it is desirable to cast upon a tapering or conical case and to give to the casting the greatest diameter from outer surface to outer surface at the end inserted in the sand. In testimony whereof I have hereunto set my hand and Seal this 6th day of Jany A.D. 1825

Evd: Witnesses
W.G.C. Richard Hampton Vose
John Davis

Calvin Darby.

2—328 a.

DRAFTSMAN'S DIVISION.

*All communications should be addressed to*
"The Commissioner of Patents,
Washington, D. C."

*DEPARTMENT OF THE INTERIOR,*

United States Patent Office,

*Washington, D. C.,* ............................., *189*...

*SIR:*

*The printed* ......copies...... *of Patent No.* C Darby
Jan 22 1825

......are...... *exhausted.*

*As soon as printed a copy will be mailed you to complete your order.*

*By direction of the Commissioner:*

*Very respectfully,*

..................................................
*Chief Clerk.*

314316-97-5m